United States Patent [19]

Lindner

[11] 4,066,331
[45] Jan. 3, 1978

[54] CUBE CORNER TYPE RETROREFLECTORS WITH IMPROVED CUBE CORNER UNIT RELATIONSHIPS

[75] Inventor: Henry Lindner, Wood Dale, Ill.

[73] Assignee: Beatrice Foods Co., Elgin, Ill.

[21] Appl. No.: 699,886

[22] Filed: June 25, 1976

[51] Int. Cl.² .......................................... G02B 5/124
[52] U.S. Cl. ................................... 350/103; 350/109
[58] Field of Search ................. 350/103, 97, 106, 102, 350/109

[56] References Cited

U.S. PATENT DOCUMENTS

| 2,310,790 | 2/1943 | Jungersen | 350/109 |
| 3,541,606 | 11/1970 | Heenan et al. | 350/103 |
| 3,923,378 | 12/1975 | Heenan | 350/102 |

Primary Examiner—John K. Corbin
Assistant Examiner—B. W. delos Reyes
Attorney, Agent, or Firm—Hill, Gross, Simpson, Van Santen, Steadman, Chiara & Simpson

[57] ABSTRACT

A cube corner type retroreflector comprised of transparent solid material or the like wherein retroreflective units of preferably different types are distributable over the entire surface of a product reflector. Individual retroreflective units are arranged in row in such retroreflector and all of the cube corner retroreflective units in each row have substantially identical characteristics. In such a reflector, two different types of cube corner retroreflective units are distributable over the entire face of a product reflector unit instead of being grouped together into specific regions of retroreflective properties.

8 Claims, 20 Drawing Figures

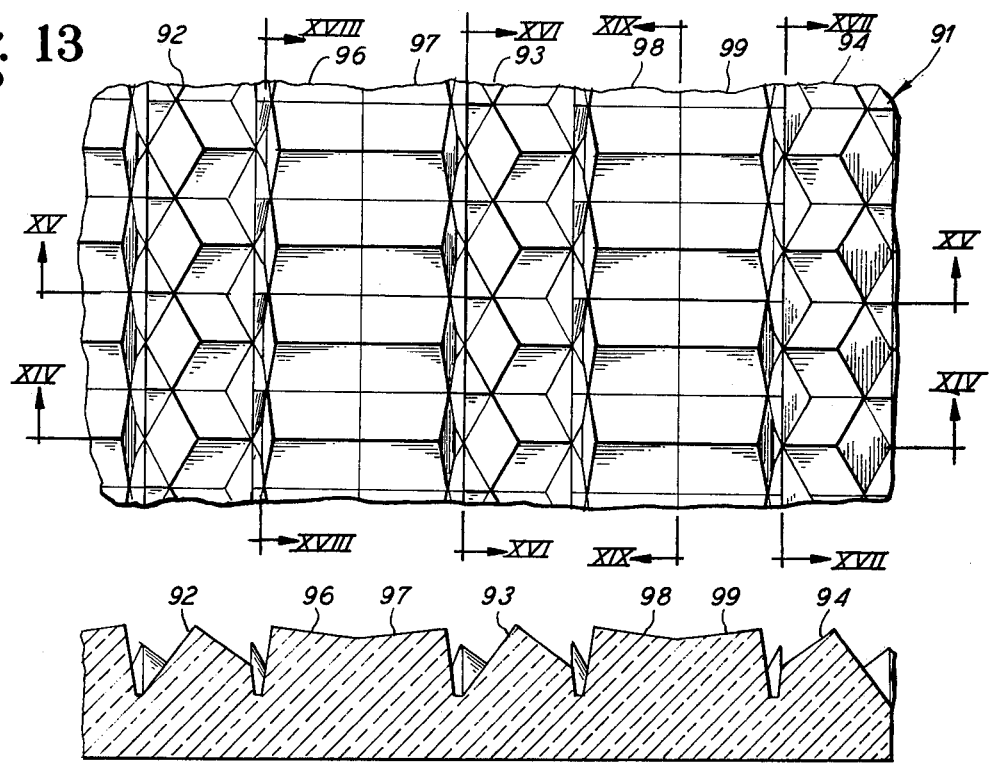
Fig. 13
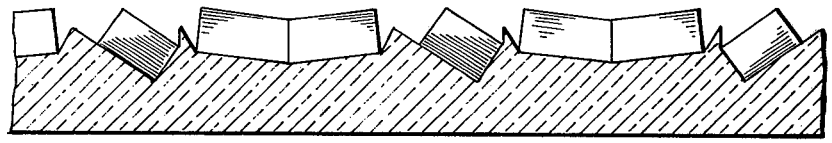
Fig. 14
Fig. 15
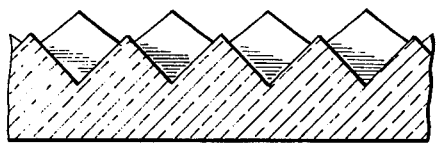 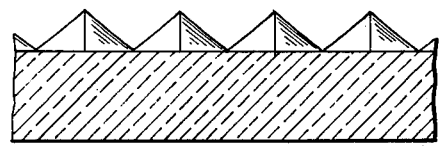
Fig. 16        Fig. 17
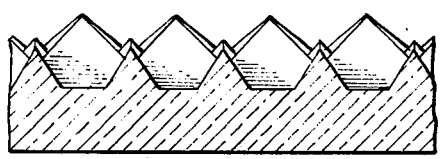 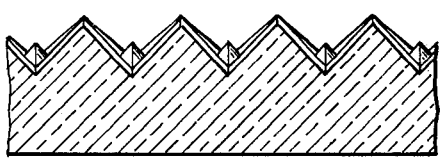
Fig. 18        Fig. 19

CUBE CORNER TYPE RETROREFLECTORS WITH IMPROVED CUBE CORNER UNIT RELATIONSHIPS

BACKGROUND OF THE INVENTION

A cube corner type retroreflector, for example, that shown and described in the Heenan et al U.S. Pat. No. 3,541,606, which incorporates two or three retroreflective areas, each area being comprised of a group of discrete reflector elements or units, each group having members with similar respective optical axes which are disposed collectively at an angle which differs from the corresponding angle in each of the other groups, suffers from the disadvantage that the total retroreflective surface region thereof has necessarily heretofore been comprised of such groups, and the total area each group occupies comprises a relatively large percentage of the total retroreflective surface region of such a given cube corner type reflector. Thus, if perchance a portion of the surface area of an individual retroreflector utilizing two or three such different groups of reflector elements therein is partially covered over as by a foreign body, so that, for example, the surface area occupied by one group of reflector elements is rendered non-functional, that reflector body itself is no longer fully retroreflective of light incident thereagainst, and thus that retroreflector is not retroreflective at the angles and to the extent previously served by the uncovered groups of retroreflector elements. This result, as a practical matter, can be regarded as having serious safety consequences, particularly in the area of reflectorized vehicles, such as bicycles, which are equipped with reflectors having multiple groups of discrete reflector elements. For example, a bicycle equipped with a reflector having two or three different groups of cube corner reflector elements therein, as indicated above, may no longer be seen by, for example, a motorist approaching such so equipped moving vehicle at night from an angle of from about 40° to 70°, for example, if such reflector's wide angle groups are obscured by spatter of road mud, or the like. Consequently, in cube corner reflector art, there is a need for a cube corner type retroreflector having two or more different groups of discrete cube corner reflector elements therein comprising the entire retroreflective region with each group having its members with similar respective optical axes which are disposed at different angles as taught in the prior art, but wherein the individual members of these groups are so-distributed and so-intermixed across the entire retroreflective region of such reflector that a partial obscuring of that reflector's retroreflective region does not stop completely the generation of a desired, designed pattern of light retroreflection intended to be achievable with such reflector.

Because cube corner type retroreflectors comprised of molded transparent solid material have heretofore characteristically been manufactured from molds having incorporated thereinto, as the molding surface for forming cube corner retroreflective units, monolithic electroforms made from entire groups or clumps of facetted pin bundles wherein in individual pins are appropriately facetted and arranged so as to produce an electroformable surface incorporating a plurality of discrete reflector units, it is heretofore not been possible to produce retroreflectors of the class indicated above wherein two or more different groups of cube corner retroreflector elements are disposed over the entire region of such reflector. Thus, as those skilled in the art of cube corner reflector manufacture will know, molds for cube corner retroreflective reflectors are prepared by a manufacturing sequence in which tiny pins, which commonly can be hexagonally shaped, having like facets formed at a forward end of each pin, are grouped into a pattern or bundle. The faceted pin ends of the bundle then serve as a form or surface upon which an electroform mold is made. Electroform molds are currently made by electroplating nickel or the like onto and over a pin bundle so that, in such process, all points, including the high points and the low points thereof, respectively, over such a group of pins are reversed in exact mirror immage fashion in the product electroform over their respective locations in the pin bundle. Then, using the product electroform, a mold is made in which transparent plastic reflectors are moldable. Because of the small size of the individual cube corner retroreflective units in such an electroform, and also because of cube corner retroreflective unit geometries, it has heretofore been necessary in the manufacture of molds for making cube corner retroreflectors to employ individual electroform structures wherein all of the discrete cube corner retroreflective units therein comprising a region of retroreflective faceted units have optical axes disposed substantially parallel to one another. Then, in the process of making a completed mold, having two or three different groups of retroreflective areas, several different types of separately formed electroform structures are mounted together usually and typically in an adjoining, adjacent relationship, each individual such electroform structure being comprised of a plurality of cube corner retroreflective units wherein the optical axes are respectively disposed parallel to one another, thereby to achieve a reflector of the character as described, for example, in the aforementioned Heenan et al U.S. Patent.

It has recently been discovered that electroform construction or equivalent, such as above described, can be transversely sliced or cut up, as with a metal saw or the like, into a plurality of elongated slab-like bodies, each one having spaced, generally parallel respective side walls with connecting edge walls and end walls. This slicing is conductable in such a manner that, in each slab-shaped body, one edge wall thereof has defined therein a plurality of cube corner retroreflective units arranged in a row which extends lengthwise along and in the face of such one edge wall. The individual slab-shaped bodies which result are then adapted to be mounted together in a side-by-side, preferably aligned, relationship into a block so as to provide a desired region of cube corner retroreflective units. By interposing in some chosen appropriate manner in adjacent side by side relationship to one another different slab-shaped bodies, a wide variety of patterns of cube corner type retroreflective units can be produced, and mold assemblies can be fabricated incorporating such a resulting block. See my copending application filed on even date herewith (identified by U.S. Ser. No. 699,959, filed June 25, 1976), the teachings of which are incorporated by reference into the present specification.

BRIEF SUMMARY OF THE INVENTION

In accordance with the present invention, there is provided a new and very useful class of cube corner type retroreflectors. Each such reflector comprises a molded substantially transparent body having a front face with a generally smooth, flattened portion which is in spaced, generally parallel relationship to a portion of a rear face thereof. Such rear face portion has defined therein a plurality of rows. Each said row being comprised of a plurality of cube corner retroreflective units.

The retroreflective units comprising each row are substantially identical to each other. Each cube corner retroreflective unit in an individual said row is defined by three flat faces which are arranged circumferentially about an optical axis extending therethrough. These three faces are inclined at a similar angle relative to such optical axis. Also, these three faces meet at an apex point along such optical axis. The interrelationship between such three faces and the associated said optical axis is such that a ray of incident light striking the front face portion of a given reflector passes through such reflector and strikes one of the three such faces within a predetermined range of angles relative to such optical axis. Such incident light ray is then deflected successively against the other two of such faces and then is substantially retroreflected away from such unit and out through such face portion of such reflector.

The reflective units comprising each row have substantially parallel respective optical axes and also have substantially coplanar respective apex points. Preferably in any given retroreflector of this invention, the apex points of one row are generally positioned so as to be substantially coplanar with the apex points of the other rows comprising the row plurality.

In each row, the individual reflective units are so-arranged that a common edge exists between each adjacent pair of said reflective units. Spaces between side edge portions of the respective units in each row and edge portions of each row are occupied by fractions of reflective unit faces (characteristically, either one half faces or one quarter faces).

Preferably an individual retroreflector of this invention contains at least two different types of rows, each such row type incorporating a different type of retroreflective unit class therein.

The present invention makes possible the intermixing of rows of different types of retroreflective units across the retroreflective face of a cube corner type reflector in ways which avoid the existance of groups of discrete reflector elements over significantly large areas of a given retroreflective surface area in a particular reflector.

Many other and further advantages, objects, aims, purposes and the like will be apparent to those skilled in the art from the teachings of the present specification taken together with the appended drawings.

BRIEF DESCRIPTION OF DRAWINGS

In the drawings:

FIG. 13 is a view similar to FIG. 3 but showing an alternative embodiment in a retroreflector of this invention;

FIG. 14 is a longitudinal sectional view taken along the line XIV—XIV of FIG. 13;

FIG. 15 is a longitudinal sectional view taken along the line XV—XV of FIG. 13;

FIG. 16 is a transverse sectional view taken along the line XVI—XVI of FIG. 13;

FIG. 17 is a transverse sectional view taken along the line XVII—XVII of FIG. 13;

FIG. 18 is a transverse sectional view taken along the line XVIII—XVIII of FIG. 13;

FIG. 19 is a transverse sectional view taken along the line XIX—XIX of FIG. 13.

DETAILED DESCRIPTION

Figure 1:
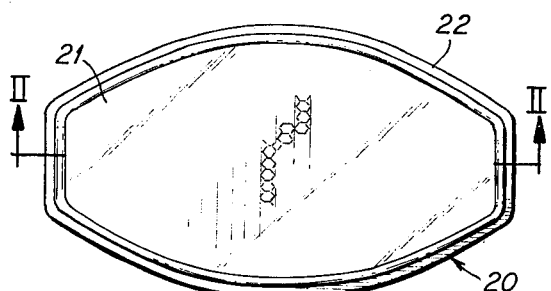
FIG. 1 is a plan view of the front face of one embodiment of a reflector of the present invention.
Figure 2:
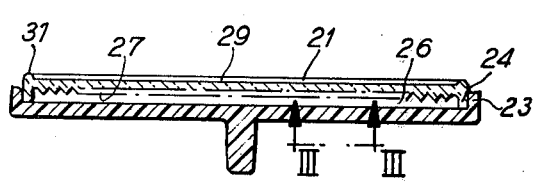
FIG. 2 is a longitudinal sectional view taken along the line II—II of FIG. 1.

In FIGS. 1 and 2 is seen an embodiment of a retroreflector of the present invention such being designated herein in its entirety by the numeral 20. Retroreflector assembly 21 is seen to comprise a reflector 21 and a backer assembly 22, the reflector 21 and the backer assembly 22 each being formed of a single piece of molded plastic. Reflector 21 is preferably comprised of a substantially completely transparent resin, such as an acrylic resin, a polycarbonate resin, or the like. The backer assembly 22 is preferably formed of an opaque plastic, such as an ABS resin, a nylon resin, a polyester resin, or the like.

Backer assembly 22 is provided with an upturned outer flange 23 around the perimeter of the outer edges thereof, and reflector 21 is provided with an inturn flange 24 around its outer perimeter. The relationship between reflector 21 and backer assembly 22 is such that flange 24 is received within the flange 23 and the terminal portions of flange 24 abut against the inside face of the backer assembly 22. The terminal end portions of the flange 24 are sealingly engaged with adjacent portions of the backer assembly 22 so as to provide, in effect, a moisture proof compartment 26 between the reflector 21 and the backer assembly 22 so as to protect the back face 27 of reflector 21 from contamination by atmospheric and environmental materials. Back face 27 has formed therein a plurality of cube corner type retroreflective units, which, in the embodiment shown, are of a type and character as illustrated in FIGS. 3 through 7. The back face 27 is in spaced generally parallel (grossly) relationship to a front face 29 of reflector 21. Front face 29 has a generally smooth, flattened central region, as shown in FIGS. 1 and 2, and assembly 20 is provided with a ridge 31 which is integral with the outer edge of front face 29 which serves to rigidify and strengthen the reflector 21; such a ridge 31 is an optional feature for a reflector of this invention. In general, reflectors 21 of this invention may be associated with any particular type of backer assembly and can have any particular type of configuration and any particular type of cube corner retroreflective units defined in a back face thereof so long as such units have a character as defined and set forth in the present invention.

Figure 3:
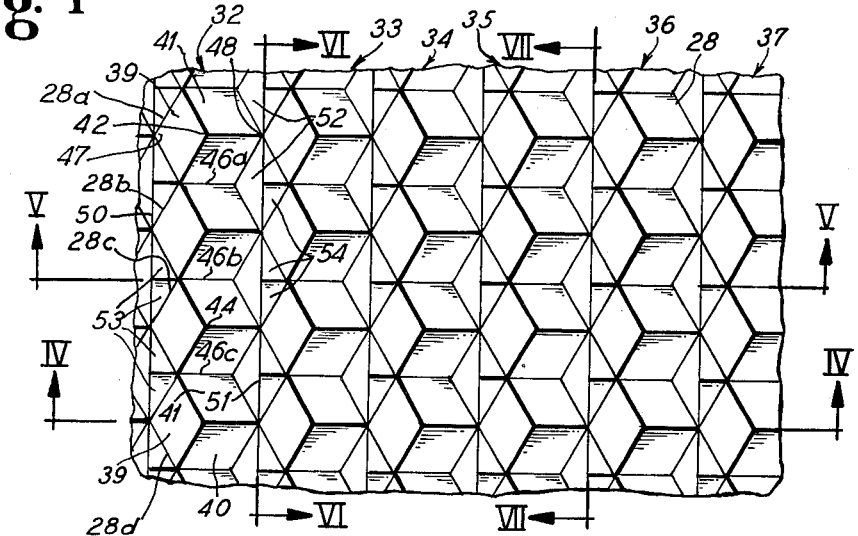
FIG. 3 is an enlarged detail view of the back face of the cube corner retroreflective region of the reflector shown in FIGS. 1 and 2 and taken along the line III—III of FIG. 2.

Referring to FIG. 3, it is seen that the back or rear face 27 has defined therein a plurality of rows here numbered for convenience consecutively as rows 32 through 37 for illustration purposes, and each such row 32 through 37 is comprised of a plurality of adjacent cube corner retroreflective units 28, the units 28 in row 32 being numbered specifically herein for convenience and discussion purposes as units 28a, 28b, 28c, and 28d.

The retroreflective units 28 comprising each row 32 through 37 are substantially identical to each other. Thus, in an individual row 32, each cube corner retroreflective unit 28a, 28b, 28c and 28d is defined by three flat faces 29, 40 and 41 which are arranged circumferentially about an optical axis 42 associated with each unit 28. In the embodiment illustrated in FIGS. 3 through 7, each optical axis 42 extends perpendicularly to the face 29 of reflector 21, and hence in FIG. 3 show only as points. As can be seen by reference to FIGS. 3 through 7, each of the faces 29, 40 and 41 is inclined at a similar angle 43 relative to optical axis 42. Also, the faces or facets 39, 40 and 42 join at an apex point 44 which is along and coincident with the optical axis 42.

In each unit 28, the relationship between facets 39, 40 and 41 and their associated optical axis 42 is generally such that, in a molded reflector 21, a ray of incident light striking one of the faces 26, 27 and 28 after first striking the front face 29, then passing through the body of reflector 21, and striking one of the three such faces 39, 40, and 41 within a predetermined range of angles relative to the optical axis 42, is deflected successively against the other two of such faces and then is substantially retroreflected away from the unit 28 and out through the front face 29 of reflector 21.

The reflective units 28 comprising each row such as row 32 through 37 have substantially parallel respective optical axes 42 and has substantially coplanar respective apex points 44. In any given reflector such as reflector 21, the apex points, such as points 44, of one row, such as row 32, are generally positioned so as to be substantially coplanar with the apex points of the other rows comprising the row plurality employed in any given such reflector.

In each row, such as row 32, the individual reflective units, such as units 28a, 28b, 28c, and 28d, are so arranged that a common edge such as edge 46a, 46b, and 46c exists between each adjacent pair of such reflective units, such as pairs 28a and 28b, pairs 28b and 28c, and pairs 28c and 28d, respectively. Preferably each unit 28 in reflector 21 is hexagonally shaped, as shown. Preferably in each row, such as row 32, each unit 28 is so oriented that a pair of opposed corners 47 and 48 as in unit 28a coincide with the spaced parallel sides, such as sides 50 and 51 of row 32.

Figure 4:
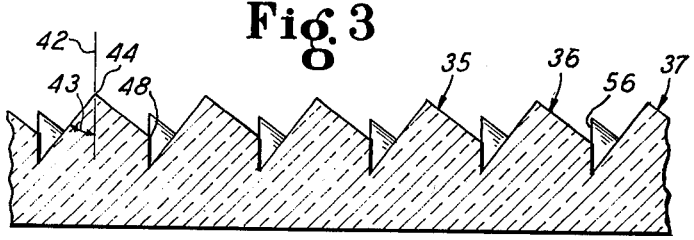
FIG. 4 is a longitudinal sectional view taken along the line IV—IV of FIG. 3.
Figure 5:
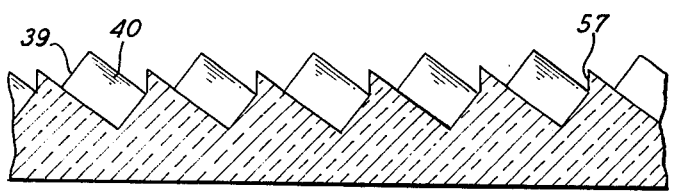
FIG. 5 is a longitudinal sectional view taken along the line V—V of FIG. 3.
Figure 6:
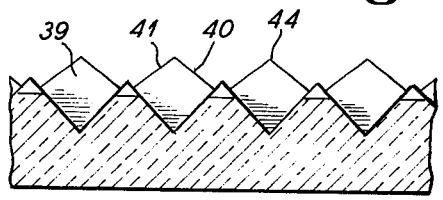
FIG. 6 is a transverse sectional view taken along the line VI—VI of FIG. 3.
Figure 7:
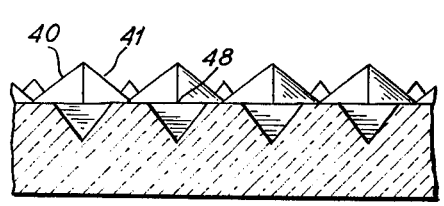
FIG. 7 is a transverse sectional view taken along the line VII—VII of FIG. 3.

In each row, such as row 32, the individual reflective units, such as units 28a, 28b, 28c and 28d, are so arranged that spaces between side edge portions of the respective such units in each such row, and the side edge portions of each row, such as side edges 50 and 51 of row 32, are occupied by fractions of cube corner type unit faces. Characteristically such face fractions comprise either one half faces, such as faces 52 in row 32, or one quarter faces, such as faces 53 in row 32, when each unit 28 is hexagonal in perimeter configuration. As between adjacent rows, such as rows 32 and 33, it is preferred to have an alignment between such fractions of reflective unit faces, and also such an orientation between such faces, that some retroreflection results of the cube corner type, as illustrated, in, for example, FIGS. 3 through 7, especially FIG. 3, by the combination of half faces 52 with quarter faces 54 (the former being associated with row 32, the latter being associated with row 33). Since the respective faces involved are not of equal size, such as is achieved in an individual unit 28, the amount of retroreflection achieved therefrom inherently is reduced compared to that achieved from a unit 28, as those skilled in the art will appreciate. Typically, as in the embodiment illustrated in FIGS. 3 through 7, the combination of quarter faces and half faces does not result in a true retroreflective unit of the character as employed in, for example, units 28 because, as illustrated in FIGS. 4 and 5, ledges 56 and 57 exist between adjacent rows, such as rows 36 and 37 in this illustration.

Turning to FIGS. 8 through 12, there is seen an illustration of the rear or back face 61 of an alternative embodiment of a cube corner retroreflector of this invention, such assembly for present illustrative purposes being considered to be similar in front and side face characteristics to those of reflector 21, but, as those skilled in the art will appreciate, any desired configuration of such a reflector embodiment may be utilized incorporating a back face comparable to back face 61 as herein illustrated and described.

Figure 8:
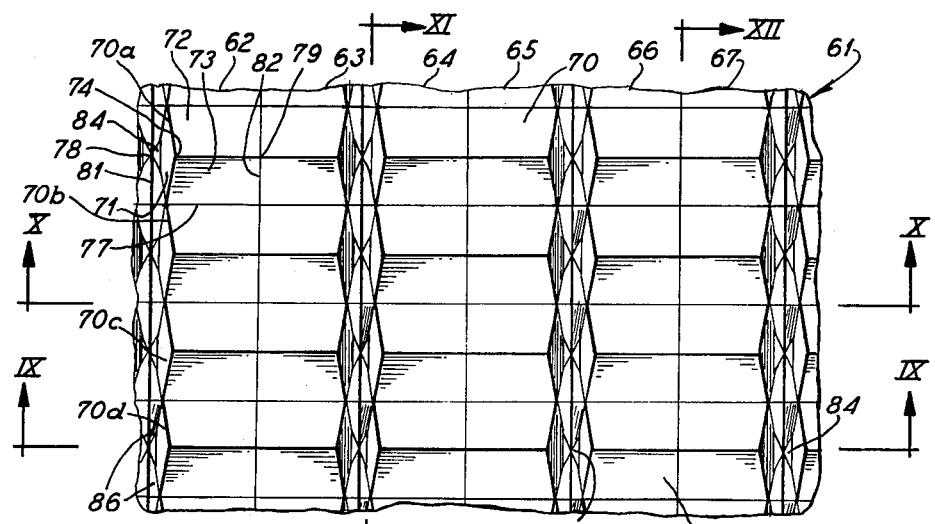
FIG. 8 is a view similar to FIG. 3 but showing an alternative embodiment of a reflector of this invention.
Figure 9:
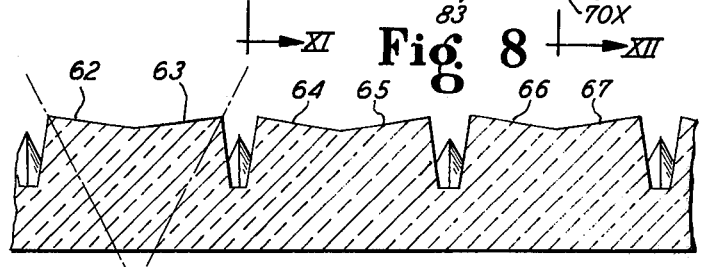
FIG. 9 is a longitudinal sectional view taken along the line IX—IX of FIG. 8.
Figure 10:
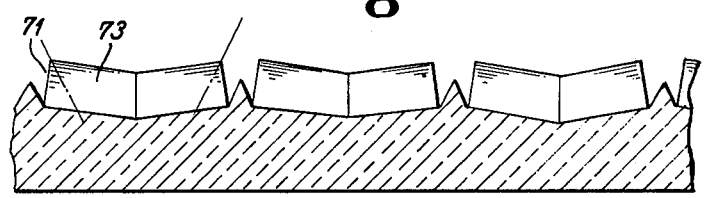
FIG. 10 is a longitudinal sectional view taken along the line X—X of FIG. 8.
Figure 11:
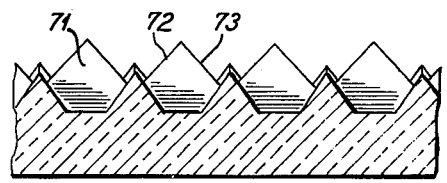
FIG. 11 is a transverse sectional view taken along the line XI—XI of FIG. 8.

Back face 61 is seen to be defined by a plurality of rows which are numbered for convenience as rows 62 through 67 in, for example, FIG. 8. Each of such rows 62 through 68 is comprised of a plurality of cube corner retroreflective units 70. Each such row, such as rows 62, is defined by a pair of spaced parallel sides 71 and 72.

The retroreflective units, such as specific units 70a, 70b, 70c and 70d comprising each row, such as row 62, are substantially identical to each other. Each unit 70 in an individual such row 62-68 is defined by three flat faces 71, 72, and 73 which are arranged circumferentially about an optical axis 74 extending therethrough. The three faces 71, 72 and 73 are inclined at a similar angle relative to optical axis 74. Also, the three faces 71, 72 and 73 meet at an apex point 75 along such optical axis 74.

The interrelationship between the three faces 71, 72 and 73 and their associated optical axis 74 is such that a ray of incident light striking the front face (not shown) of a reflector using back face 61, passing through the reflector body, reaching the back face 61 and striking one of such three faces 72, 73, and 74 within a predetermined range of angles relative to the optical axis 74 is deflected successively against the other two of such faces and then is substantially retroreflected away from such unit and out through the front face portion thereof.

The retroreflective units 70 comprising each row, such as row 62, have substantially parallel respective optical axes 74, and all retroreflective units in back face 61 have substantially coplanar respective apex points 75.

The units 70 differ from the units 28 in that the respective optical axes 74 of the units 70 are inclined at an angle with respect to the plane defining the apex points 75 in comparison to the perpendicular orientation of optical axes 42 to the plane defining the apex points 44.

As those skilled in the art will appreciate, units 28 result in a type of cube corner retroreflection termed "standard" in this art, and, typically, an incident ray of light striking against the front face 29 of reflector 21 up to an angle of about 30° on each side of optical axis 42 is retroreflected. When the optical axis of a cube corner retroreflective unit is angled, such as the optical axis 74 of unit 70, retroreflectivity approaching 90° with respect to the plane of apex points may be achieved, depending upon the angle of inclination of the optical axis 74 and other factors having to do with the design criteria of an individual reflector, as those skilled in the art will appreciate. When a reflector has retroreflective capability at angles up to about 50° or even more with respect to a normal to such plane of apex points, such reflector is termed a wide angle reflector in this art. Back face 61 represents, for present illustrative purposes, a reflector having wide angle retroreflective capability.

In back face 61, each unit, such as 70a, terminates in adjacent relationship to the adjoining unit, such as unit 70b, so as to have a side 77 coincident with each of the respective units 70a and 70b. Each unit 70 has a pair of opposed face corners, such as corners 78 and 79 in unit 70a terminating at the perimeter of the associated unit, here unit 70a, and also coinciding substantially with a different one of the row sides 81 and 82, for example, of row 62.

Cube corner type reflectors of the present invention involving angled, particularly wide angle, cube corner type retroreflective units display an upturned facet region 83 of illustrative unit 70x. Because such a spike-like projection in region 83 can cause plastic material hangups during mold operations utilized in the formation of reflectors of the present invention, it is preferred in the present invention to remove such a spike like projection from the mold surface and to produce thereby during molding such a region 83. Region 83, is thus a small flat surfaced region 84, as shown in unit 70a, for example, which region 83, though itself not part of a cube corner unit, is so small as not to seriously impair the retroreflective efficiency of an entire back face 61. Region 83 permits the passage of light normally therethrough which is advantageous when a back face 61 is being used in a vehicular tail light or the like.

Techniques for the manufacture of mold assemblies suitable for use in the manufacture of reflectors of the present invention are disclosed and described in my copending application filed on even date herewith as above referenced.

In the practice of the present invention, it is preferred to utilize in reflectors of this invention wide angle retroreflective units in rows as herein detailed for the primary reason that, in a given row, such as in row 62, one side thereof, such as side 82 of row 62, can be readily prepared so as to have incorporated thereinto no quarter faces, half faces or other fractional faces as a unit, such as unit 70, and such an elimination of face fractions is achieved with very little loss in retroreflective efficiency of an individual wide angle retroreflective cube corner unit, such as a unit 70. The opposed side of a row, such as side 81 of row 62 does have inherently incorporated thereinto fractional faces, such as the approximately quarter faces 86 in the row 62. By comparison, as can be seen by reference to back face 27 of reflector 21 as shown in FIGS. 3 through 7, a so-called standard row of units 28 of this invention inherently has fractional facets on each opposed side thereof.

A back face, such as back face 61, represents a preferred wide angle configuration of cube corner units for use in the practice of the present invention for the reason that such an arrangement permits one to accomplish within a single region of wide angle retroreflectivity of the cube corner type both a left hand and a right hand pattern of wide angle retroreflectivity which is not possible and not achievable in the prior art using a single electroform body. Thus, in back face 61, all of the optical axes of units 70 in a row, such as row 62, are inclined in one direction relative to the plane of apex points 75, whereas all of the optical axes of the units 70 in the adjacent row 63 are inclined in an opposite direction, but at an equal number of degrees, relative to the plane of apex points 75.

Figure 20:
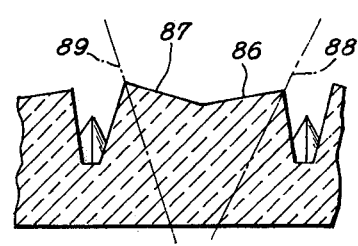
FIG. 20 is a longitudinal sectional view similar to FIG. 9 but showing an alternative embodiment of a reflector of this invention.
Figure 12:
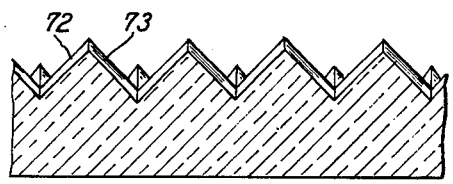
FIG. 12 is a transverse sectional view taken along the line XII—XII of FIG. 8.

The type of row arrangement employed in back face 61 produces a symmetrical left hand and right hand combined pattern of retroreflection. By varying the structure and the type of bodies employed into such a back face 61, one may produce non-symmetrical left hand and right hand patterns of angled retroreflectivity using cube corner type retroreflective units. Thus, one may incorporate into a given back face adjoining rows such as shown in FIG. 20 wherein the respective individual unit members comprising a given row such as 86 and 87 have respective optical axes 88 and 89 which are not complimentary or opposed to an equal extent relative to one another. Wide angle cube corner reflectors of this invention can be fabricated wherein all of the rows of wide angle elements are inclined to give retroreflection in a given angle relative to a vertical instead of being symmetrical with respect to a vertical as shown, for example, in FIGS. 8 through 12. Two different fields of angled, retroreflected light in a single given direction can be utilized if desired.

A particularly advantageous embodiment of the present invention is illustrated by back face 91 shown in FIGS. 13 through 19. In back face 91 two different types of rows are employed. Thus, rows 92, 93, and 94 may be considered to be identical in character and structure to the rows 32 through 37 in back face 27 earlier discussed while rows 96, 97, 98 and 99 may be considered to be identical in form and structure to, for example, rows 62, 63, 64 and 65, respectively, of back face 61. The respective rows 92, 93 and 94, and 96, 97, 98 and 99 are interdigitated so that each three adjacent rows provides a full prechosen desired field of cube corner type retroflectivity proceeding from a left to a right hand direction transversely with respect to the direction in which the rows are arranged by using a plurality of rows interdigited generally in the manner previously indicated a total region of retroreflectivity can be obtained of size as desired to which two or three different types of retroreflective units are incorporated or more as desired and yet such units are not arranged into discrete groups as taught in the prior art.

The claims are:

1. In a cube corner-type retroreflector of the type comprising a molded, substantially transparent body having a front face with a generally smooth, flattened portion which is in spaced, generally parallel relationship to a portion of a rear face thereof, the improvement which comprises A. a rear face portion having defined therein a plurality of rows, each said row having defined therein a plurality of individually complete cube corner retroreflective units, each row being defined by a pair of spaced, parallel edges, B. said complete retroreflective units comprising each row being substantially identical to each other, each complete cube corner retroreflective unit in an individual said row being defined by three flat faces which are arranged circumferentially about an optical axis extending therethrough, said three faces being inclined at a similar angle relative to said optical axis, and said three faces meeting an apex point along said optical axis, the interrelationship between said three faces and the associated said optical axis being such that a ray of incident light striking said front face portion, passing through said body and striking one of said three faces within a predetermined range of angles relative to said optical axis is deflected successively against the other two of said faces and then is substantially retroreflected away from said unit and out through said front face portion, C. said complete retroreflective units comprising each row having substantially parallel respective said optical axes, all complete retroreflective units comprising each row having substantially coplanar respective said apex points, and all said optical axes being substantially perpendicular to such plane defined by said apex points, D. adjacent pairs of said complete retroreflective units in each row having a common edge therebetween, E. each said complete retroreflective unit of each said row having a pair of opposed face corners at the perimeter thereof, each one of said opposed face corners coinciding substantially with a different one of said row edges of the associated row thereof, and F. regions of each said row located laterally of each said retroreflective unit and adjacent both of said row edges being occupied by faces which are not associated with complete tube corner retroreflective units.

2. A retroreflector of claim 1 which is provided with an inturned flange about its periphery relative to said rear face and which has mounted across said rear face and such inturned flange a backer plate means, said backer plate means being sealingly engaged with said inturned flange.

3. In a cube corner-type retroreflector of the type comprising a molded, substantially transparent body having a front face with a generally smooth, flattened portion which is in spaced, generally parallel relationship to a portion of a rear face thereof, the improvement which comprises A. a rear face portion having defined therein at least two different groups of rows, the individual rows of each respective group being interdigitated with one another each said row having defined therein a plurality of individually substantially complete cube corner retroreflective units, each row being defined by a pair of spaced, parallel edges, adjacent pairs of rows having a common edge therebetween, B. said substantially complete retroreflective units comprising each row being substantially identical to each other, each substantially complete cube corner retroreflective unit in an individual said row being defined by three flat faces which are arranged circumferentially about an optical axis extending therethrough, said three faces being inclined at a similar angle relative to said optical axis, and said three faces meeting an apex point along said optical axis, the interrelationship between said three faces and the associated said optical axis being such that a ray of incident light striking said front face portion, passing through said body and striking one of said three faces within a predetermined range of angles relative to said optical axis is deflected successively against the other two of said faces and then is substantially retroreflected away from said unit and out through said front face portion, C. said substantially complete retroreflective units comprising each row having substantially parallel respective said optical axes, substantially complete retroreflective units comprising each row having substantially coplanar respective said apex points, D. the relationship between each said adjacent pair of rows being such that the respective angles between such plane and the said optical axes of said substantially complete retroreflective units in each row of such pair are different from one another in orientation, E. regions of each said row located laterally of each said retroreflective unit and adjacent at least one of said row edges being occupied by faces which are not associated with the substantially complete cube corner retroreflective units of each said row.

4. A retroreflector of claim 3 wherein one said group has optical axes oriented substantially perpendicular to said plane and a second said group has optical axes angularly oriented relative to said plane.

5. A retroreflector of claim 3 wherein said rear face portion includes a third group of rows which are different from each of the other two rows, each one of said rows of said third group being interdigitated with said other two rows, each one of said rows of said third group having defined therein a plurality of individually substantially complete cube corner retroreflective units, each row of said third group being defined by a pair of spaced, parallel edges each one of such edges defining when adjacent the edge of another row adjacent thereto a common edge with such other row. Said substantially complete retroreflective units comprising each row of said third group being substantially identical to each other, each substantially complete cube corner retroreflective unit in an individual said row being defined by three flat faces which are arranged circumferentially about an optical axis extending therethrough, said three faces being inclined at a similar angle relative to said optical axis, and said three faces meeting an apex point along said optical axis, the interrelationship between said three faces and the associated said optical axis being such that a ray of incident light striking said front face portion, passing through said body and striking one of said three faces within a predetermined range of angles relative to said optical axis is deflected successively against the other two of said faces and then is substantially retroreflected away from said unit and out through said front face portion, said substantially complete retroreflective units comprising each row of said third group having substantially parallel respective said optical axes, substantially complete retroreflective units comprising such row having substantially coplanar respective said apex ponts, which are oriented differently from those said optical axes of each of the other two said row groups, regions of each said row of said third group located laterally of each said retroreflective unit thereof and adjacent at least one of said row edges thereof being occupied by faces which are not associated with the substantially complete cube corner retroreflective units of each said row.

6. A reflector of claim 5 wherein the optical axes of one group are oriented substantially perpendicular to said plane, the optical axes of a second group are oriented angularly relative to said plane.

7. A reflector of claim 5 wherein the optical axes of the third group are oriented angularly relatively to said plane but in a configuration which is substantially coplanar with the respective optical axes of said first group and said second group and wherein the angle of inclination of the optical axes of said third group relative to said first group is equal to that of said second group but in an opposite direction relative to that of said second group.

8. A retroreflector of claim 3 which is provided with an inturned flange about its periphery relative to said rear face and which has mounted across said rear face and such inturned flange a backer plate means, said backer plate means being sealingly engaged with said inturned flange.

* * * * *